United States Patent [19]

Thompson et al.

[11] Patent Number: 5,201,372
[45] Date of Patent: Apr. 13, 1993

[54] WING FOLD IMPLEMENT WITH HYDRAULIC MODE INDICATOR

[75] Inventors: Warren L. Thompson, Ankeny; Marvis L. Landon, Indianola, both of Iowa

[73] Assignee: Deere & Company, Moline, Ill.

[21] Appl. No.: 769,042

[22] Filed: Sep. 30, 1991

[51] Int. Cl.$^5$ ............................................. G01L 19/12
[52] U.S. Cl. .................................. 172/430; 116/271; 116/334; D10/123; 73/714
[58] Field of Search ................. 172/430, 311, 316; 74/DIG. 7; 116/266, 271, 334; 91/1; 73/714; 37/DIG. 19; D10/99, 100, 102, 122, 123, 126; D23/233, 235, 246

[56] References Cited

U.S. PATENT DOCUMENTS

| | | | |
|---|---|---|---|
| D. 95,200 | 4/1935 | Brown | D10/102 |
| D. 291,231 | 8/1987 | Datta | D23/246 |
| 3,785,339 | 1/1974 | Niccoli | 116/271 |
| 3,975,959 | 8/1976 | Larkin | 116/271 |
| 4,630,526 | 12/1986 | Burk et al. | |
| 4,915,014 | 4/1990 | Gilmore et al. | |
| 4,932,476 | 6/1990 | Hoehn | |

FOREIGN PATENT DOCUMENTS

| | | | |
|---|---|---|---|
| 2659184 | 7/1978 | Fed. Rep. of Germany | 172/430 |
| 18722 | 1/1991 | Japan | 116/334 |

Primary Examiner—Peter M. Cuomo
Assistant Examiner—Spencer Warnick

[57] ABSTRACT

A gage connected to the rod end of the wing cylinder on a multi-section implement senses rod end pressure at the output of the hydraulic wing control (HWC) valve. The HWC valve is engaged or disengaged using the selective control valve (SCV) in the tractor, and the gage provides a visual indication to the operator of the following modes: 1) off; 2) fold wings; 3) unfold wings; 4) field operation—push wings down; and 5) field operation—pull wings up. In field operation, the gage also provides an indication of the force with which the cylinders are pushing or pulling on the wings to affect the cutting force of the wings.

12 Claims, 1 Drawing Sheet

WING FOLD IMPLEMENT WITH HYDRAULIC MODE INDICATOR

BACKGROUND OF THE INVENTION

1) Field of the Invention

The present invention relates generally to agricultural implements and more specifically to implements with hydraulically operated wings, wherein weight transfer between the main frame and wings is controlled by a valve.

2) Related Art

Devices generally of the type shown in U.S. Pat. Nos. 4,932,476; 4,915,014 and 4,630,526, of Common ownership with the present application, provide adjustable down pressure for the wings of an implement such as a disk harrow to compensate for varying soil conditions and wing sizes. A valve connected between the wing fold cylinders and the tractor selective control valve (SCV) includes a rotatable knob for adjusting pressure at the wing cylinders to increase or decrease the down pressure of the wings without the use of gauge wheels, springs or ballast.

One problem operators face with such an adjustable down pressure device has been lack of understanding the operation and adjustment of the device. The valve can be engaged or disengaged using the SCV in the tractor. If engaged, the valve controls the wing fold cylinders to either pull up on the wings (to reduce penetration) or cause the wings to push down (to enhance penetration). However, the operator often does not know whether the valve is engaged, or if engaged, whether the cylinders are pushing or pulling on the wings. Previous adjustment procedures call for the operator to turn the adjusting knob until movement is observed in the wing fold cylinder linkage and then to turn the knob either counter-clockwise or clockwise depending on whether wing depth is to be increased or decreased. Inability to determine in which mode the device is operating often leads to less than optimal implement performance and productivity and increases the time necessary to make needed adjustments.

BRIEF SUMMARY OF THE INVENTION

It is therefore an object of the present invention to provide a device for improving the ability of an operator of a hydraulic wing control valve on a disk or similar implement to determine in which of several modes the valve is operating.

It is another object of the present invention to provide an improved visual aid for determining the mode of operation of hydraulic wing control valve or similar device. It is a further object to provide such a device which informs the operator whether or not the valve is engaged, and, if engaged, whether the cylinders are pushing or pulling on the wings and with how much force the cylinders are pushing or pulling.

In accordance with the above objects, a gage connected to the rod end of the wing cylinder on a multi-section implement senses rod end pressure at the output of the hydraulic wing control (HWC) valve. The HWC valve, which may generally be of the type described in the aforementioned U.S. Pat. No. 4,915,014, is engaged or disengaged using the selective control valve (SCV) in the tractor, and the gage provides a visual indication to the operator of the following modes: 1) off; 2) fold wings; 3) unfold wings; 4) field operation—push wings down; and 5) field operation—pull wings up. In field operation, the gage also provides an indication of the force with which the cylinders are pushing or pulling on the wings to affect the cutting force of the wings. The operator can accurately determine the wing force, and the need to observe linkage movements during adjustments is eliminated.

These and other objects, features and advantages of the present invention will become apparent to one skilled in the art upon reading the following detailed description in view of the drawings.

DETAILED DESCRIPTION OF THE DRAWINGS

Figure 1:
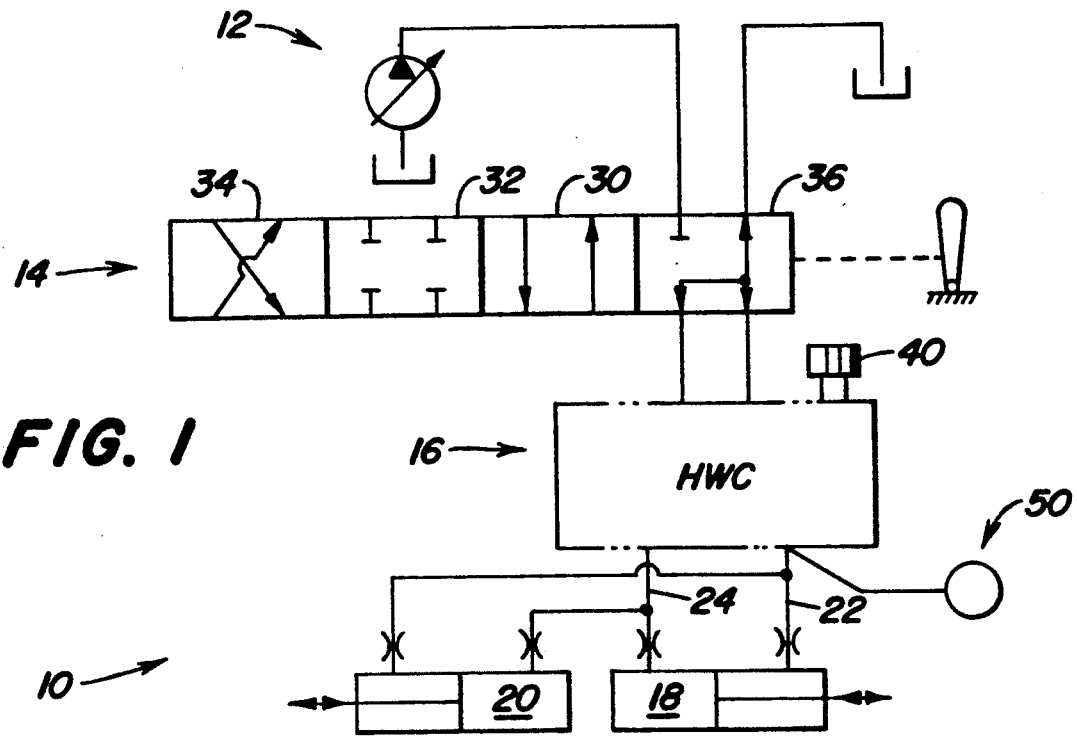
FIG. 1 is a schematic representation of a hydraulic system for a multi-section implement including the structure of the present invention.
Figure 2:
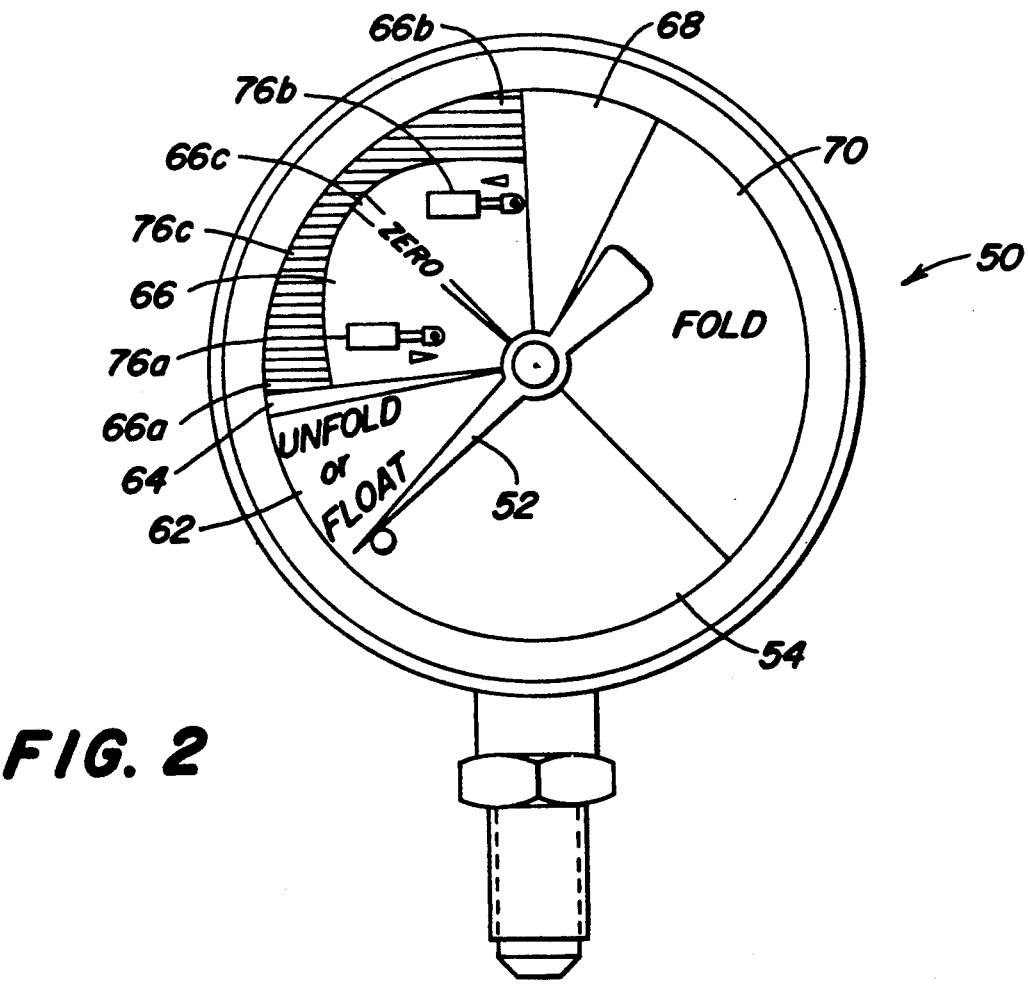
FIG. 2 is a front view of the indicating gage utilized with the system of FIG. 1.

Referring now to FIG. 1, therein is shown a hydraulic system 10 having a source of hydraulic fluid under pressure, indicated at 12, located on the tractor or towing vehicle and connected to a four-position selective control valve (SCV) 14. A conventional hydraulic wing control (HWC) valve 16 with a hydraulic circuit generally of the type shown in the aforementioned U.S. Pat. No. 4,915,014 is connected to the source 12 through the SCV 14 and to parallel connected wing cylinders 18 and 20 via output lines 22 and 24. The cylinders 18 and 20 extend between the implement wings or outrigger frames and the implement main frame (not shown) in a conventional manner.

The SCV 14 includes an extend or unfold and field position 30, a shut-off position 32, a retract or fold position 34 and a float position 36. Assuming initially that the cylinders 18 and 20 are fully retracted so that the implement wings are folded relative to the main frame in transport positions, the cylinders are first operated in the unfold mode by moving the valve 14 to position 30. The pressure side of the source is connected to the line 24 through the HWC valve 16. The rod ends of the cylinders 18 and 20 are connected through the valve 16 to the sump via line 22, and the cylinders extend to unfold the implement wings to the field working positions.

In the operating or field working mode, the HWC valve 16 controls the pressure at the cylinders 18 and 20 with the pressure determined by the setting of a screw adjustment 40 on the HWC valve 16. The amount of downward or upward force is varied by rotating the screw 40 which changes the pressure acting on the cylinder pistons to adjust the weight transfer between the wings and cutting force of the wings for varying ground conditions. If the wings are cutting too deeply under certain conditions such as when the implement is working in light soil, the screw 40 is turned in a first direction to reduce the downward force of the wings. If wing penetration is insufficient, the screw 40 is rotated in the opposite direction to increase the force on the wings.

To fold the wings, the cylinders 18 and 20 are retracted during the fold mode by moving the SCV 14 to the position 34. The HWC valve 16 automatically shifts to apply full system pressure to the rod ends of the cylinders and return the base end lines 24 to sump.

In the position 36 shown in FIG. 1, the SCV 14 connects both HWC valve input lines to each other and to the sump to provide float or free motion of the cylinders 18 and 20 (float mode) so that no weight transfer occurs as a result of cylinder action. The stop position 32 of the SCV 14 blocks flow to and from the cylinders 18 and 20 to immobilize the cylinders and stop movement of the wings, for example, when the operator wishes to halt wing motion during the folding or unfolding cycle.

A gage 50 is connected to the output port of the HWC 16 and communicates with the rod end line 22. The gage 50 includes a readout device or needle 52 and a face plate or dial 54 divided into illustrative sectors 62, 64, 66, 68 and 70 which indicate both mode of operation as well as cylinder pressure. Sector 62 includes a range of pressures from zero psi to about 400 psi, and the needle 52 will be within this range when the SCV is in the float position 36 or in the unfold position 30.

Once the implement is unfolded to the field working position by extension of the cylinders 18 and 20, the amount of downward or upward force is controlled by rotating the screw 40 on the HWC. The operational sector 66 provides an indication both of whether the cylinders 18 and 20 are pushing down or pulling up and the force with which the cylinders 18 or 20 are pushing down or pulling up. The pressure at the rod end of the cylinders is variable from a maximum down force operating pressure at 66a of approximately 525 psi to a minimum down force pressure at 66b of approximately 1725 psi. A balanced force condition where there is little or no weight transfer between the main frame and wing sections of the implement is indicated by a central zero sector 66c (approximately 1000 to 1100 psi).

The sector 70 corresponds to normal folding pressures, typically in the range of approximately 1800–3000 psi. When the SCV 14 is moved to the fold position 34, the needle 52 moves into sector 70 to clearly indicate that a high folding pressure is being applied to the rod ends of the cylinders. The intermediate sector 68 separates the fold sector 70 from the operating sector 66. The intermediate sector 64 separates the unfold or float sector from the operating sector 66. Cylinder and arrow illustrations 76a and 76b in the operational sectors 66a and 66b and a variable width force indicating outer sector portion 76c provide the operator with a clear indication of operating mode and down or up force applied to the wings.

Having described the preferred embodiment, it will become apparent that various modifications can be made without departing from the scope of the invention as defined in the accompanying claims.

We claim:

1. In an implement with a first frame, a second tool-carrying frame hinged to the first frame, a hydraulic cylinder connected between the first and second frames and operable in a plurality of modes including fold and unfold modes for respectively folding and unfolding the second frame relative to the first frame and a field working mode for transferring weight between the frames to vary tool penetration, control means for adjusting the pressure of said cylinder to thereby adjust a down force on the tools on the second frame during the field working mode, and sensor means responsive to pressure of said cylinder for providing a visual indication of which of the plurality of modes the cylinder is operating, wherein the sensor means includes means for providing an indication of the amount and direction of weight transfer when the cylinder is operating in the field working position.

2. The invention as set forth in claim 1 wherein the sensor means further includes means for providing an indication of the pressure of said cylinder when the cylinder is operating in the fold mode.

3. In an implement with a first frame, a second tool-carrying frame hinged to the first frame, a hydraulic cylinder connected between the first and second frames and operable in a plurality of modes including fold and unfold modes for respectively folding and unfolding the second frame relative to the first frame and a field working mode for transferring weight between the frames to vary tool penetration, control means for adjusting the pressure of said cylinder to thereby adjust down force on the tools on the second frame during the field working mode, and sensor means responsive to pressure of said cylinder for providing a visual indication of which of the plurality of modes the cylinder is operating, wherein the sensor means comprises a hydraulic gage connected to the control means for providing an indication of the amount and direction of weight transfer when the cylinder is operating in the field working mode.

4. The invention as set forth in claim 3 wherein the gage includes a readout having an operating sector for indicating the field working mode.

5. The invention as set forth in claim 4 wherein the gage further includes a fold sector for indicating the fold mode and pressure of said cylinder during the fold mode.

6. The invention as set forth in claim 5 wherein the gage further includes an unfold or float sector offset from the operating and fold sectors.

7. The invention as set forth in claim 4 wherein the gage includes a portion within the operating sector for indicating a generally balanced condition wherein little or no weight transfer occurs between the frames.

8. The invention as set forth in claim 7 wherein the portion for indicating the generally balanced condition is centrally located within the operating sector.

9. In an implement with a first frame, a second tool-carrying wing frame hinged to the first frame, a hydraulic cylinder connected between the frames and operable in a plurality of modes including fold and unfold modes for respectively folding and unfolding the second frame relative to the first frame and a field working mode for transferring weight between the frames to vary tool penetration, and a hydraulic wing control valve for adjusting the pressure of said cylinder to thereby adjust the down force on the tools on the second frame during the field working mode, means responsive to pressure of said cylinder for providing a visual indication of which of the plurality of modes the cylinder is operating, said means responsive to pressure of said cylinder including a hydraulic pressure gage connected to the cylinder having a face plate divided into mode indicating sectors including a field working mode sector and a folding mode sector.

10. The invention as set forth in claim 9 wherein the field working mode sector includes a first portion indicating weight transfer from the main frame to the wing frame and a second portion for indicating weight transfer from the wing frame to the main frame.

11. The invention as set forth in claim 10 wherein the field working mode sector includes a third portion indicating a balanced force condition where there is little or no weight transfer between the main frame and wing frame.

12. The invention as set forth in claim 11 wherein the field working mode sector includes a force indicator section for facilitating visual perception of the amount of weight transfer between the frames.

* * * * *